US012711409B2

(12) United States Patent
Sawal et al.

(10) Patent No.: US 12,711,409 B2
(45) Date of Patent: Aug. 18, 2026

(54) METHOD AND SYSTEM TO DETERMINE IMPACT ANALYSIS OF COMPONENTS SUPPORTING CLOUD SERVICE

(71) Applicant: Dell Products L.P., Round Rock, TX (US)

(72) Inventors: Vinay Sawal, Fremont, CA (US); Udhaya Chandran Shanmugam, Santa Clara, CA (US); Sithiqu Shahul Hameed, Chennai (IN); Ramya Ramachandran, Hopkinton, MA (US); Sudhakaran Balakrishnan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 656 days.

(21) Appl. No.: 17/973,968

(22) Filed: Oct. 26, 2022

(65) Prior Publication Data

US 2024/0144060 A1 May 2, 2024

(51) Int. Cl.
*G06N 7/01* (2023.01)
*G06F 16/901* (2019.01)

(52) U.S. Cl.
CPC ........... *G06N 7/01* (2023.01); *G06F 16/9024* (2019.01)

(58) Field of Classification Search
CPC .............................. G06N 7/01; G06F 16/9024
See application file for complete search history.

(56) References Cited

PUBLICATIONS

Agrawal, J., et al, Efficient Pattern Matching over Event Streams, [received Jul. 15, 2025]. Retrieved from Internet:<https://dl.acm.org/doi/abs/10.1145/1376616.1376634> (Year: 2008).*

Bohner, S., Extending Software Change Impact Analysis into COTS Components, [received Jul. 15, 2025]. Retrieved from Internet:<https://ieeexplore.ieee.org/abstract/document/1199468> (Year: 2002).*

Darwiche, A., Decomposable Negation Normal Form, [received Jul. 15, 2025]. Retrieved from Internet:<https://dl.acm.org/doi/abs/10.1145/502090.502091> (Year: 2001).*

Garg, R., et al, Evaluation of Influencing Factors in an Impact Analysis Methodology for the Adoption of Cloud-based Services, [received Jul. 15, 2025].Retrieved from Internet:<https://ieeexplore.ieee.org/abstract/document/7214148> (Year: 2015).*

(Continued)

*Primary Examiner* — Miranda M Huang
*Assistant Examiner* — Bart I Rylander
(74) *Attorney, Agent, or Firm* — Terrile, Cannatti & Chambers, LLP; Emmanuel A. Rivera

(57) ABSTRACT

Described herein are methods and a system for analyzing the impact of multiple components with one another that support a cloud service. Events are collected in time series from the components and aggregated in a relationship tree that groups the components. Propositions as to the events are created from which a conjunctive normal form (CNF) statement is derived. The CNF statement is converted to one or more directed acyclic graphs (DAG). The DAGs are traversed to determine TRUE values used to provide remediations solutions.

20 Claims, 4 Drawing Sheets

(56) References Cited

PUBLICATIONS

Magnoni,,L., Intelligent monitoring and fault diagnosis for ATLAS TDAQ: a complex event processing solution, [received Jul. 15, 2025]. Retrieved from Internet:<https://sfera.unife.it/handle/11392/2389450> (Year: 2012).*

Flouris, I., et al, Issues in Complex Event Processing Systems, [received Jul. 15, 2025]. Retrieved from Internet:<https://ieeexplore.ieee.org/abstract/document/7345503> (Year: 2015).*

Petersen, E., et al, An Unsupervised rule generation approach for Online Complex Event Processing, [received Jul. 15, 2025]. Retrieved from Internet:<https://ieeexplore.ieee.org/abstract/document/8548210> (Year: 2018).*

Pham, C., et al, Failure Diagnosis for Distributed Systems Using Targeted Fault Injection, [received Jul. 15, 2025]. Retrieved from Internet:<https://ieeexplore.ieee.org/abstract/document/7484300> (Year: 2016).*

Graden, J., Managing product variants in a component-based system, [received Nov. 5, 2025]. Retrieved from Internet:<chrome-extension://efaidnbmnnnibpcajpcglclefindmkaj/https://fileadmin.cs.lth.se/cs/Personal/Lars_Bendix/Teaching/Lund/Theses/GS09/GS09.pdf> (Year: 2009).*

Emerson.com, The Power Derived from Automating Root Cause Analysis, White Paper, Oct. 2020, https://www.emerson.com/documents/automation/white-paper-power-derived-from-automating-root-cause-analysis-plantweb-en-6267566.pdf.

* cited by examiner

400

| Event | value | value | value | value | value | value | value | value |
|---|---|---|---|---|---|---|---|---|
| P1 | 0 | 1 | 0 | 1 | 0 | 1 | 0 | 1 |
| P2 | 0 | 0 | 1 | 1 | 0 | 0 | 1 | 1 |
| P3 | 0 | 0 | 0 | 0 | 1 | 1 | 1 | 1 |
| CNF | FALSE | FALSE | FALSE | FALSE | TRUE | FALSE | TRUE | TRUE |

METHOD AND SYSTEM TO DETERMINE IMPACT ANALYSIS OF COMPONENTS SUPPORTING CLOUD SERVICE

BACKGROUND OF THE INVENTION

Field of the Invention

The present invention relates to analyzing the impact of operating multiple devices or components that support a cloud service. More specifically, embodiments of the invention provide remediation recommendations as to the multiple devices or components.

Description of the Related Art

Entities, such as companies, are increasing using cloud computing to provide services that are flexible, accessible, expandible, and reliable. Cloud computing can be through public cloud, private cloud, or a hybrid combination. In certain cases, an entity can also have devices or components that are physically located at the entity, such as in a data center. Such devices or components can be installed in one or more computing racks.

The devices or components can be segmented into particular types or categories, such as computing, switching, storage, management, etc. Multiple devices and components interact with one another and provide services. When an issue(s) occurs in a device or component, failures can occur in other devices and components that result in service failures.

Since the components are categorized, particular teams or personnel may be responsible for determining device or component failures. This trouble shooting can involve manual review of failure, event logs, etc. by each team (personnel). Because devices and components interact with one another, information may need to be exchanged between teams or personnel. In many cases, a solution may not be available that correlates failures and identifies root causes. In other words, it may be difficult to provide an acceptable root cause analysis (RCA) and support service level agreements (SLA).

SUMMARY OF THE INVENTION

A computer-implementable method, system and computer-readable storage medium for analyzing impact of an aggregation of multiple components comprising requesting and collecting events from the multiple components aggregated by a relationship tree; creating propositions as to the events; creating a conjunctive normal form (CNF) statement as to the propositions; converting the CNF statement to one or more directed acyclic graphs (DAG); and traversing the DAGs to determine TRUE values used to provide remediations solutions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein support cloud computing service of multiple devices and components (hereafter, component). Embodiments provide for a relationship algorithm that correlates component issues and provide solutions, such as repair or replace. Issues, alerts, and warning as to cloud related service components are collected. Implementations provide for a relationship tree to be created between the components. Problems are modeled as satisfiability model, and reduced to a conjunctive normal form or CNF. The problem represented by the CNF is solved using a directed acyclic graph or DAG.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
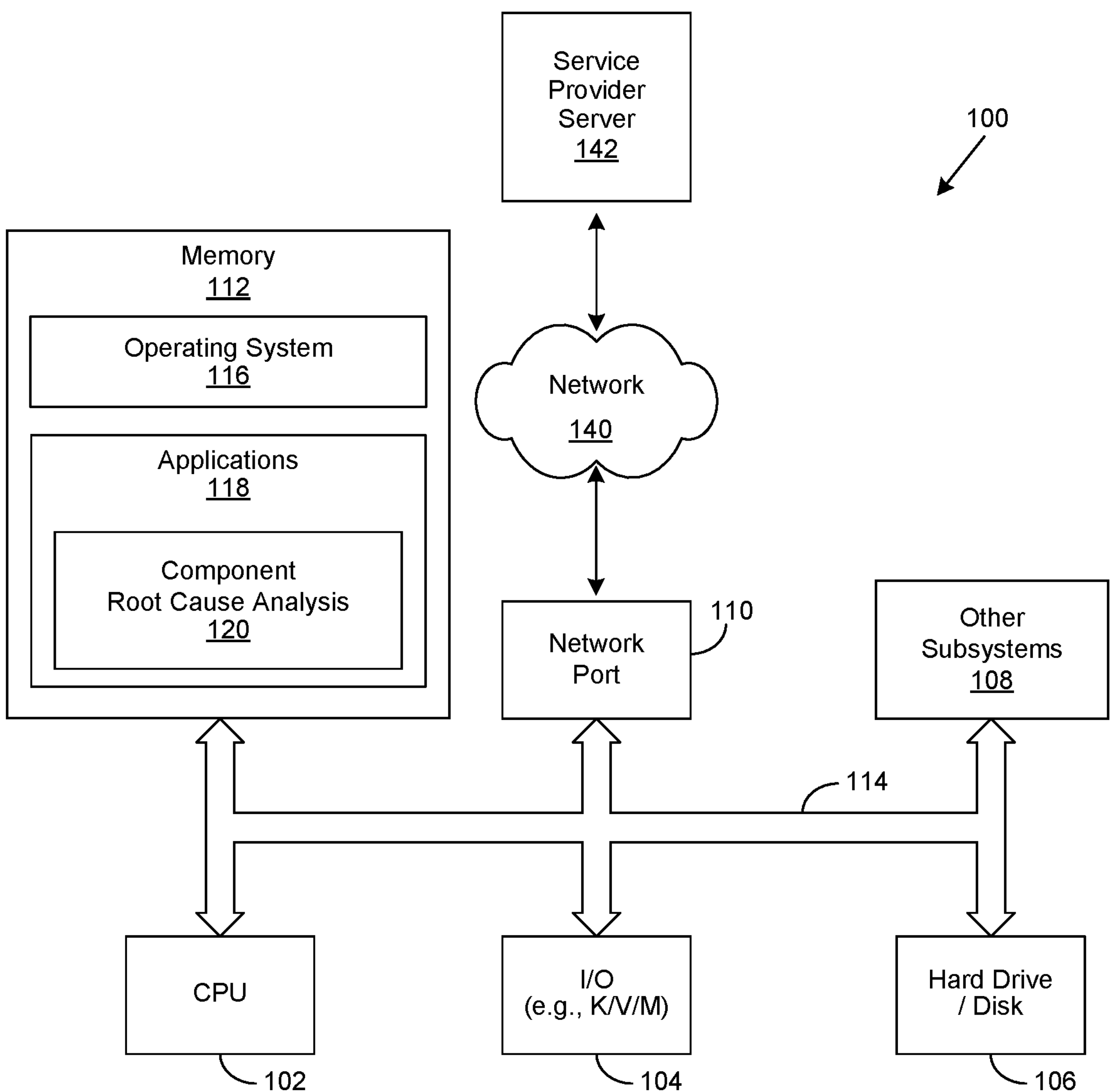
FIG. 1 is a general illustration of components of an information handling system as implemented in the present invention.

FIG. 1 is a generalized illustration of an information handling system (IHS) 100 that can be used to implement the system and method of the present invention. The information handing system (IHS) 100 can be a host to the peripheral devices described herein.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116 and applications 118. Implementations provide for applications 118 to include component root cause analysis 120. The component root cause analysis 120 includes algorithms that are further described herein, to correlate all the issues of components supporting a cloud computing service. In general, component root cause analysis 120 is configured to collect issues, alerts, and warnings from cloud computing service components. A relationship tree is created between the components. Possible component problems are modeled as a satisfiability problem and reduced to conjunctive normal form (CNF) and solved. An implication tree directed acyclic graph (DAG) is constructed by decomposing a compound proposition, as further described herein.

Figure 2:
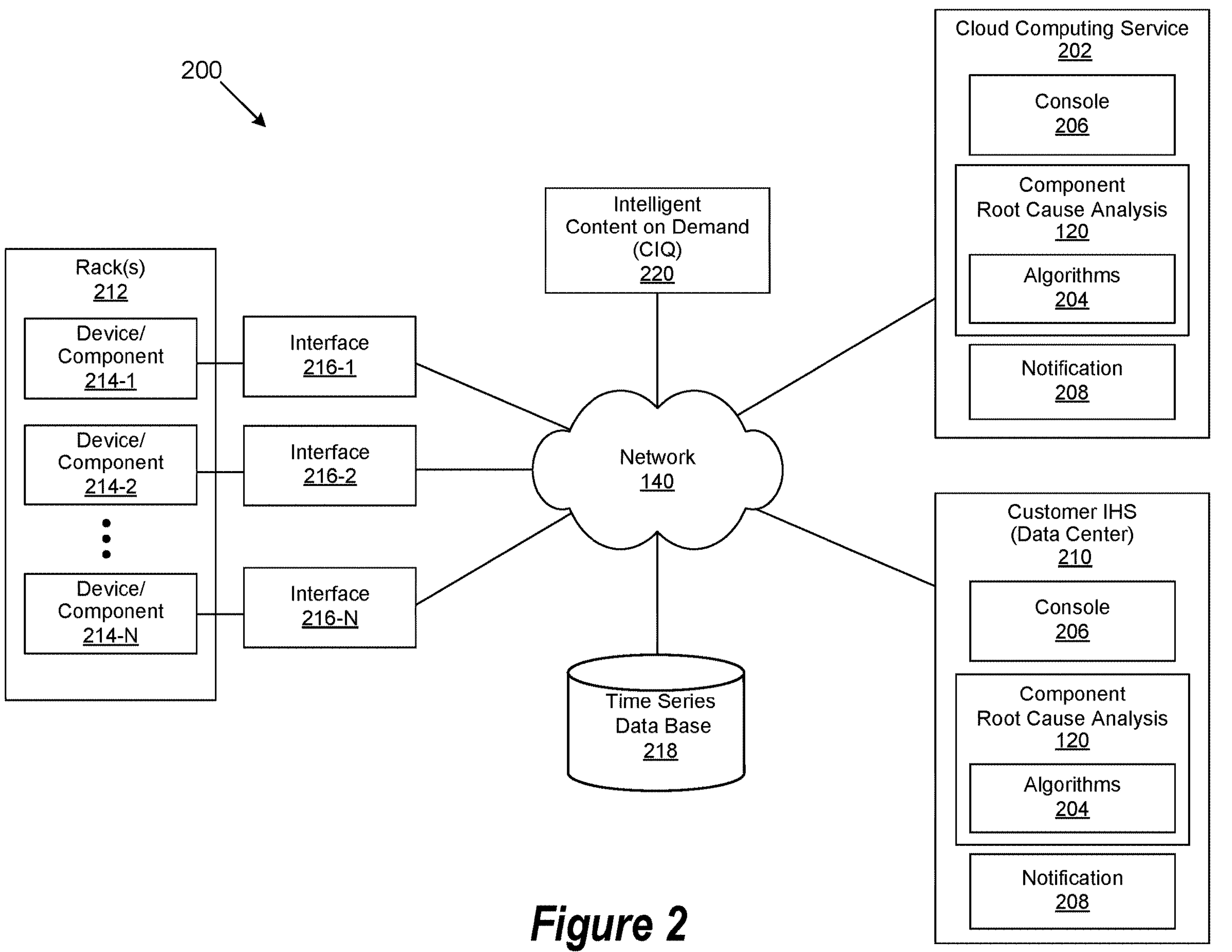
FIG. 2 is a system as implemented in the present invention.

FIG. 2 shows a system 200 that supports the processes described herein. Various implementations provide for the system 200 to include a cloud computing service 202. Embodiments provide for the cloud computing service 202 to include or use various computing resources, such as information handling system (IHS) 100.

Cloud computing service 202 includes the component root cause analysis 120 as described in FIG. 1. Component root cause analysis 120 includes algorithms 204 to perform processes described herein. Implementations further provide for cloud computing service 202 to include a console 206 that shows impact analysis of solutions derived by component root cause analysis 120. A notification feature 206 can also be included.

The system 200 can include a customer information handling system 210. In various implementations, the processes described herein are performed at customer information handling system 208. In such implementations, customer information handling system 210—is configured with the component root cause analysis 120 and algorithms 204. The console 206 and notification feature 208 can also be included with the customer information handling system 210.

Cloud computing service 202 and customer information handling system 210 are connected to network 140. As described above, network 140 can include one or more wired and wireless networks, including the Internet. Network 140 connects cloud computing service 202 and customer information handling system 208 to other elements described of system 200.

System 200 includes one or more equipment racks 212 that support cloud computing service 202. Implementations provide for the equipment rack(s) 212 to be operated or controlled by a customer of support cloud computing service 202. For example, the equipment rack(s) 212 are part of a data center of the customer.

The equipment rack(s) 212 include multiple components 214. Components 214 can be grouped into various categories, such as computing (including virtual), switching, storage, management, etc.

In various implementations, specific interfaces 216 connect the components 214 to the network 140. For example, interfaces can include a web user interface, ops ramp interface, virtual component interface such as ESXi, server management component interface such as vCenter, etc.

Implementations provide for the component root cause analysis 120 to request and collect available issues and alerts, collectively referred to as events from components 214. The collected events are times series, or identified by time order. In various implementations, the time series events are stored in a time series data base 218. Implementations provide for certain events to go through an intelligent content on demand (CIQ) element 220.

Algorithms 204 include creating a relationship tree of components 212. In particular, a logical relationship tree is created. For example, the relationship tree can include components 212 in a computing infrastructure, a switching infrastructure, networking infrastructure, a storage infrastructure, a management infrastructure, etc.

Propositions or "P" are created as to events for an aggregate or group of components as to the relationship tree. Propositions are based time series events that can be stored in and accessed from time series data base 218. Each proposition is different and independent of other propositions. The following is an example of propositions P and how propositions are processed.

P1→CPU load is 80%

P2→fan tray RPM is 45,000

P3→CPU thermal sensor is 60 degrees

A propositional can be either TRUE (value of 1) or FALSE (value of 0). Given the three independent propositions P1, P2, and P3, a determination is made as to correlation impact of their interaction.

Analysis is performed over the aggregate of components over multiple propositions P. A conjunctive normal form (CNF) is established based on prior knowledge of events as derived by component root cause analysis 120. For example, if there is a temperature related problem, then the following statement expressed in conjunctive normal form is true (P1 and P3) and (notP1 and P2) and (P3 and notP2)

Therefore, when the statement is satisfied or has a value of 1, then it can be surmised that a temperature related problem exists in one of the components 214.

Using logical equivalency principal, the conjunctive normal form statement is converted to an implication directed acyclic graph (DAG). The following logical equivalencies or implications are derived.

P1 and P3=notP1→P3=notP3→P1 notP1 and P2=P1→P2=notP2→notP1

P3 and notP2=P2→P3=notP3→notP2

Figures 3, 4:
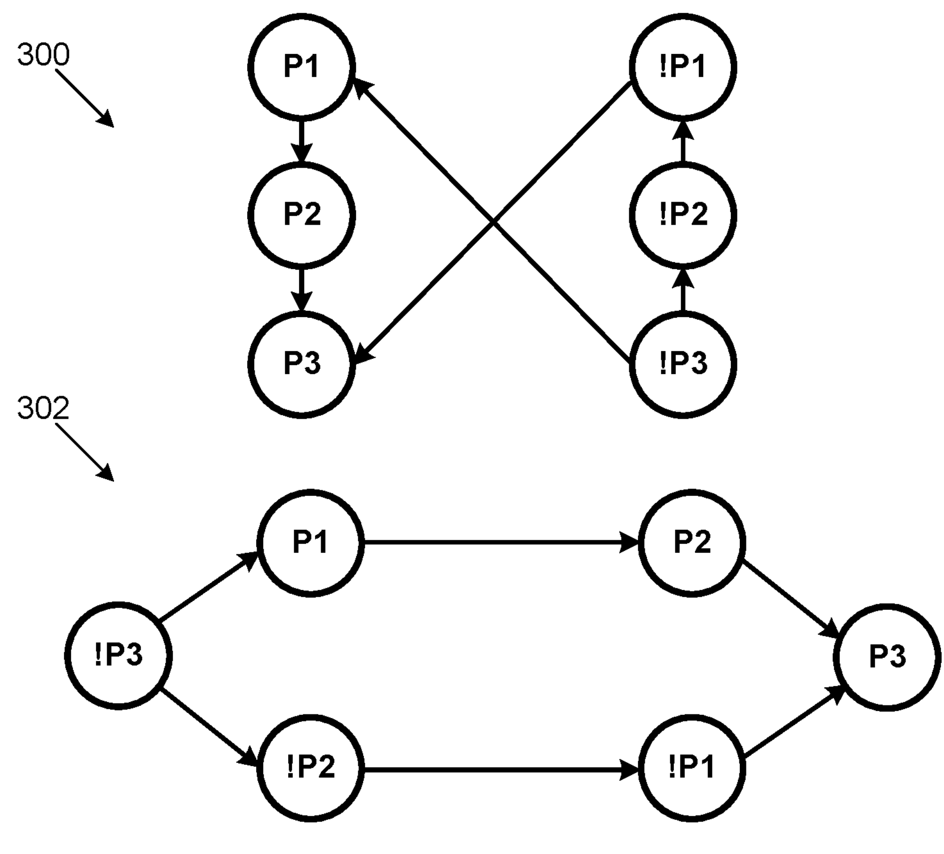
FIG. 3 are directed acyclic graphs based on based on the logical equivalencies.
FIG. 4 is a table of values for propositions placed in the conjunctive normal form statement that includes values of outcomes of reverse topological reversal of a directed acyclic graph.

The implications are drawn into DAGs. FIG. 3 shows two DAGs 300 and 302 based on the logical equivalencies or implications shown above. When the CNF value is TRUE, a particular solution level occurs, and remediation action is needed since an aggregated component 214 problem has occurred.

In a DAG, such as DAGs 300 and 302, the nodes are variables or literals, and edges are implication edges. The DAG can be condensed by identifying strongly connected components using a linear-time algorithm and reduction. The DAG is traversed in reverse topological order from a node with zero out degree (zero number of edges going out of a vertex/node). Variable values are picked such that the compound proposition is satisfied. The variables can be stored in a bitmap in a hash table as a key and value for a remediation policy. Impact analysis results can be presented in console 206.

FIG. 4 shows a table of values for propositions P1, P2, and P3 that are placed in the conjunctive normal form statement, and the instances when the conjunctive normal form statement results in a false or true value. Traversing the DAGs 400 and 402 results in values shown in table 400 of FIG. 4. In particular, table 400 is outcome values of the reverse topological reversal of DAG 302. For example, in the case when P1 is 0, P2 is 0, and P3 is 1, the value for the conjunctive normal form statement is TRUE.

Figure 5:
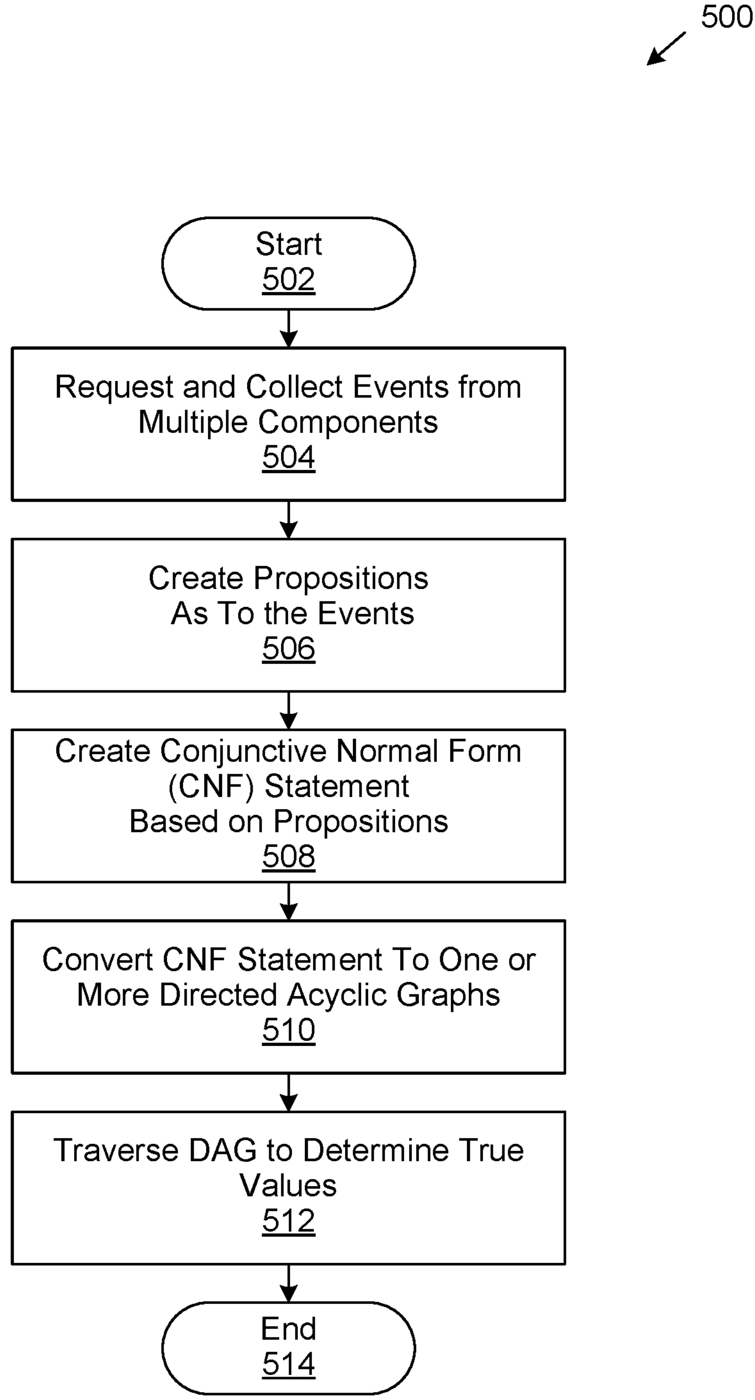
FIG. 5 is a generalized flowchart for analyzing impact of an aggregation of components.

FIG. 5 shows a generalized flowchart for analyzing impact of an aggregation of components. Implementations provide for the steps of process 500 to be performed by the component root cause analysis 120. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a request is made for events from multiple components, where the components are aggregated into a relationship tree. The requested events are collected in time series and can be stored in a database.

At step 506, propositions as to the events are created as the relationship tree. Each proposition is different and independent of other propositions. Given independency of propositions, a determination is made as to correlation impact of their interaction.

At step 508, an analysis is performed to create a conjunctive normal form (CNF) statement as to the propositions. The analysis can be based on prior knowledge of the events related to the components. When a CNF statement is found to be TRUE, a problem is identified.

At step 510, the CNF statement is converted to one more directed acyclic graphs (DAG) based on logical equivalencies or implications.

At step 512, the DAGs are traversed to determine TRUE values which imply problems or remediations solutions or policies. At step 516, the process 500 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for analyzing impact of an aggregation of multiple components supporting a cloud computing service comprising:

requesting and collecting events from the multiple components by a component root cause analysis (CRCA) component, through interfaces to the cloud computing service that include one or more of the following: a web user interface, an ops ramp interface, a virtual component interface, and a server management component interface, wherein the CRCA component creates a relationship tree algorithm that logically relates an aggregate group of components;

creating by a relationship algorithm of the CRCA component, propositions of the relationship tree as to the events of the aggregate group of components, wherein the propositions are different and independent of one another;

performing an analysis by the relationship algorithm of the CRCA component of the relationship tree on multiple propositions by:

creating a conjunctive normal form (CNF) statement as to the propositions based on prior knowledge of events derived by the CRCA component;

converting the CNF statement to one or more directed acyclic graphs (DAG);

condensing the DAG by identifying connected components using a linear-time algorithm and reduction; and traversing the condensed DAG in reverse topological order to determine TRUE values used to provide remediations solutions.

2. The computer-implementable method of claim 1, wherein the events are in time series.

3. The computer-implementable method of claim 1, wherein the collected events are stored in a database in time series.

4. The computer-implementable method of claim 1, wherein the propositions are independent of one another.

5. The computer-implementable method of claim 1, wherein the conjunctive CNF statement is based on prior events of the components.

6. The computer-implementable method of claim 1, wherein the DAGs are derived based on logical implications.

7. The computer-implementable method of claim 1 further comprising condensing the DAGs by identifying strongly connected components using a linear-time algorithm and reduction.

8. A system comprising:

a plurality of processing systems communicably coupled through a network, wherein the processing systems include non-transitory, computer-readable storage medium embodying computer program code interacting with a plurality of computer operations analyzing impact of an aggregation of multiple components supporting a cloud computing service comprising:

requesting and collecting events from the multiple components by a component root cause analysis (CRCA) component, through interfaces to the cloud computing service that include one or more of the following: a web user interface, an ops ramp interface, a virtual component interface, and a server management component interface, wherein the CRCA component creates a relationship tree algorithm that logically relates an aggregate group of components;

creating by a relationship algorithm of the CRCA component, propositions of the relationship tree as to the events of the aggregate group of components, wherein the propositions are different and independent of one another;

performing an analysis by the relationship algorithm of the CRCA component of the relationship tree on multiple propositions by:

creating a conjunctive normal form (CNF) statement as to the propositions based on prior knowledge of events derived by the CRCA component;

converting the CNF statement to one or more directed acyclic graphs (DAG);

condensing the DAG by identifying connected components using a linear-time algorithm and reduction; and traversing the condensed DAG in reverse topological order to determine TRUE values used to provide remediations solutions.

9. The system of claim 8, wherein the events are in time series.

10. The system of claim 8, wherein the collected events are stored in a database in time series.

11. The system of claim 8, wherein the propositions are independent of one another.

12. The system of claim 8, wherein the conjunctive CNF statement is based on prior events of the components.

13. The system of claim 8, wherein the DAGs are derived based on logical implications.

14. The system of claim 8 further comprising condensing the DAGs by identifying strongly connected components using a linear-time algorithm and reduction.

15. A non-transitory, computer-readable storage medium embodying computer program code for analyzing impact of an aggregation of multiple components supporting a cloud computing service, the computer program code comprising computer executable instructions configured for:

requesting and collecting events from the multiple components by a component root cause analysis (CRCA) component, through interfaces to the cloud computing service that include one or more of the following: a web user interface, an ops ramp interface, a virtual component interface, and a server management component interface, wherein the CRCA component creates a relationship tree algorithm that logically relates an aggregate group of components;

creating by a relationship algorithm of the CRCA component, propositions of the relationship tree as to the events of the aggregate group of components, wherein the propositions are different and independent of one another;

performing an analysis by the relationship algorithm of the CRCA component of the relationship tree on multiple propositions by:

creating a conjunctive normal form (CNF) statement as to the propositions based on prior knowledge of events derived by the CRCA component;

converting the CNF statement to one or more directed acyclic graphs (DAG);

condensing the DAG by identifying connected components using a linear-time algorithm and reduction; and traversing the condensed DAG in reverse topological order to determine TRUE values used to provide remediations solutions.

16. The non-transitory, computer-readable storage medium of claim 15, wherein the events are in time series.

17. The non-transitory, computer-readable storage medium of claim 15, wherein the propositions are independent of one another.

18. The non-transitory, computer-readable storage medium of claim 15, wherein the conjunctive CNF statement is based on prior events of the components.

19. The non-transitory, computer-readable storage medium of claim 15, wherein the DAGs are derived based on logical implications.

20. The non-transitory, computer-readable storage medium of claim 15 further comprising condensing the DAGs by identifying strongly connected components using a linear-time algorithm and reduction.

* * * * *